July 30, 1963 H. W. KNIGHT 3,099,297
FLUID HANDLING APPARATUS
Filed Nov. 17, 1960 3 Sheets-Sheet 1
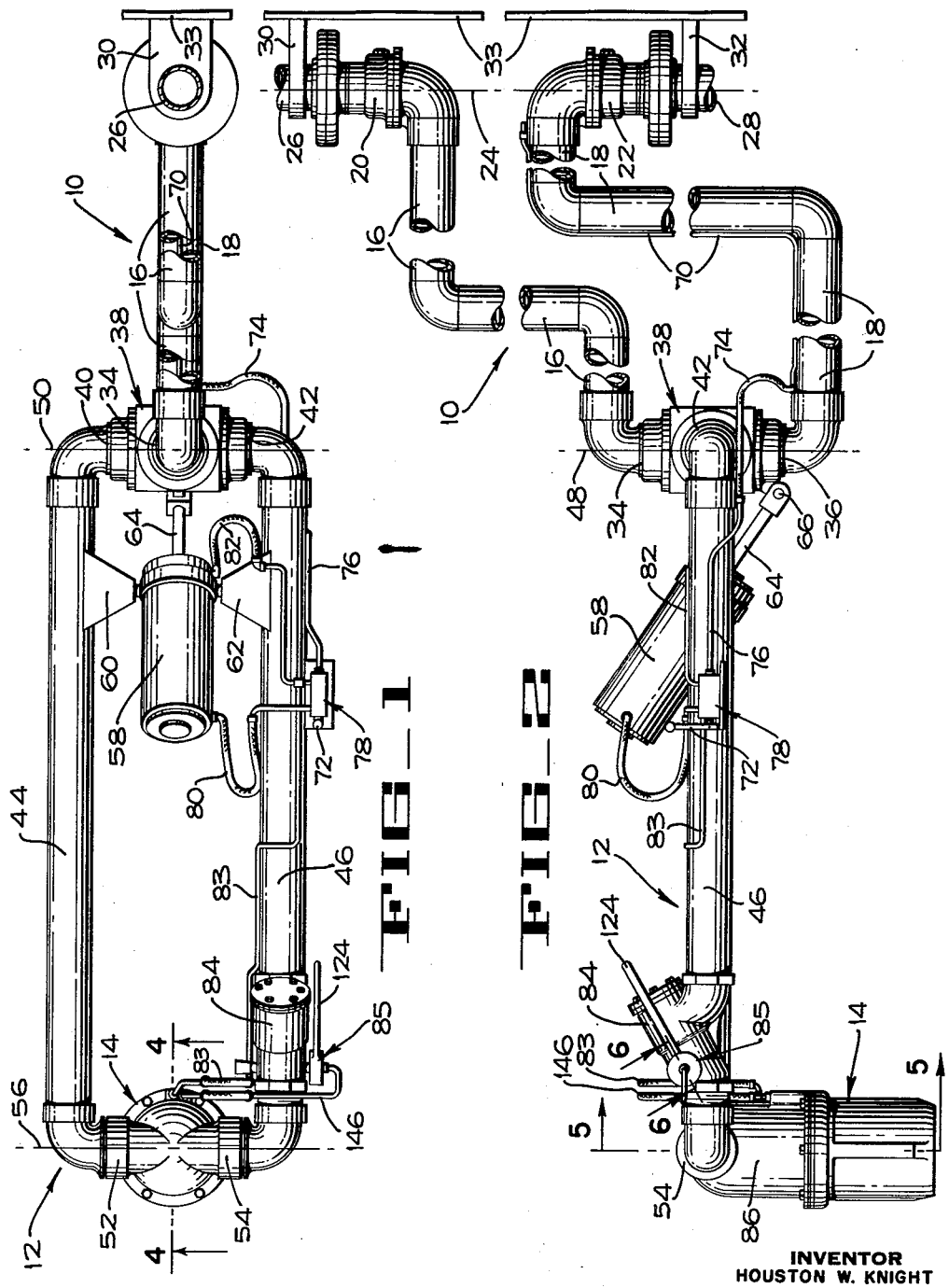
INVENTOR
HOUSTON W. KNIGHT
BY *Hans G. Hoffmeister*
ATTORNEY July 30, 1963
H. W. KNIGHT
3,099,297
FLUID HANDLING APPARATUS
Filed Nov. 17, 1960
3 Sheets-Sheet 2
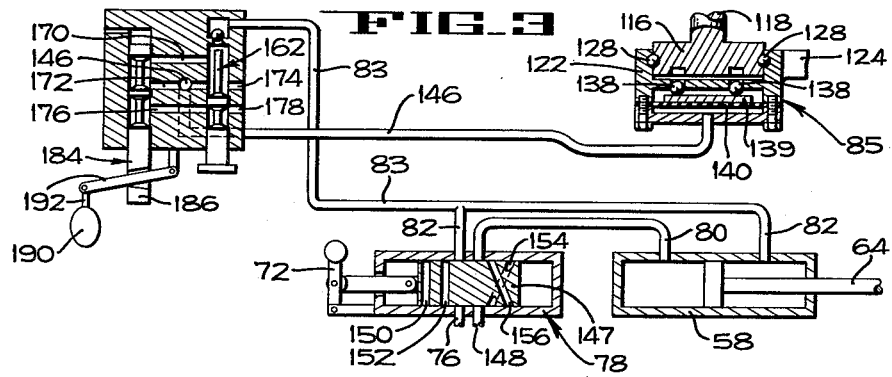
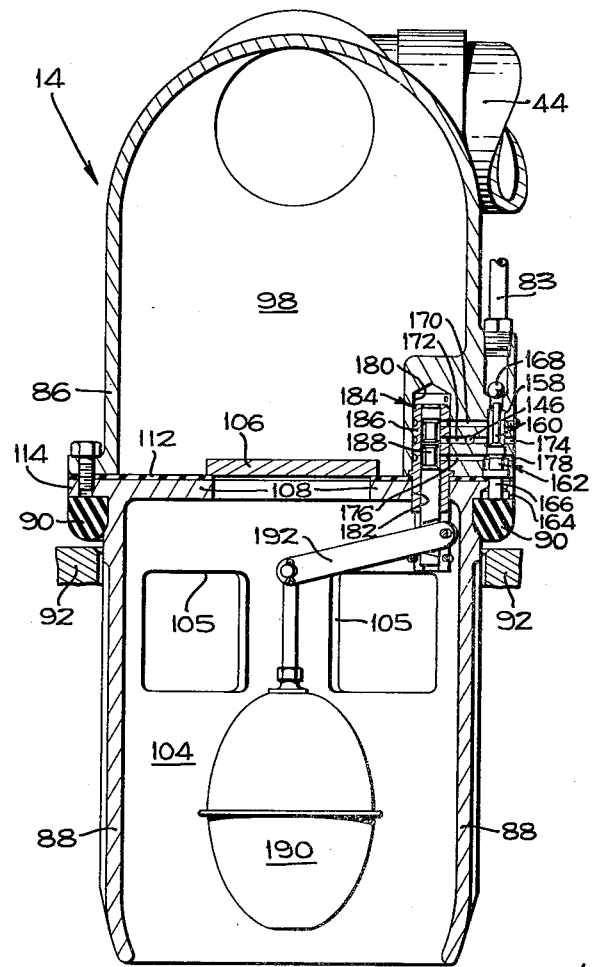
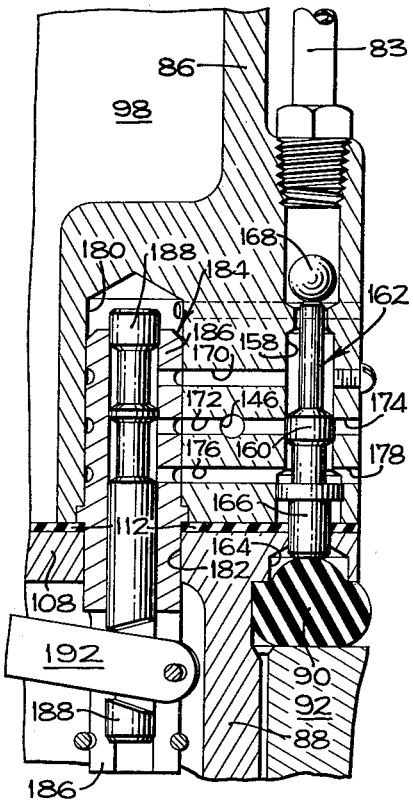
INVENTOR
HOUSTON W. KNIGHT
BY Hans G. Hoffmeister
ATTORNEY

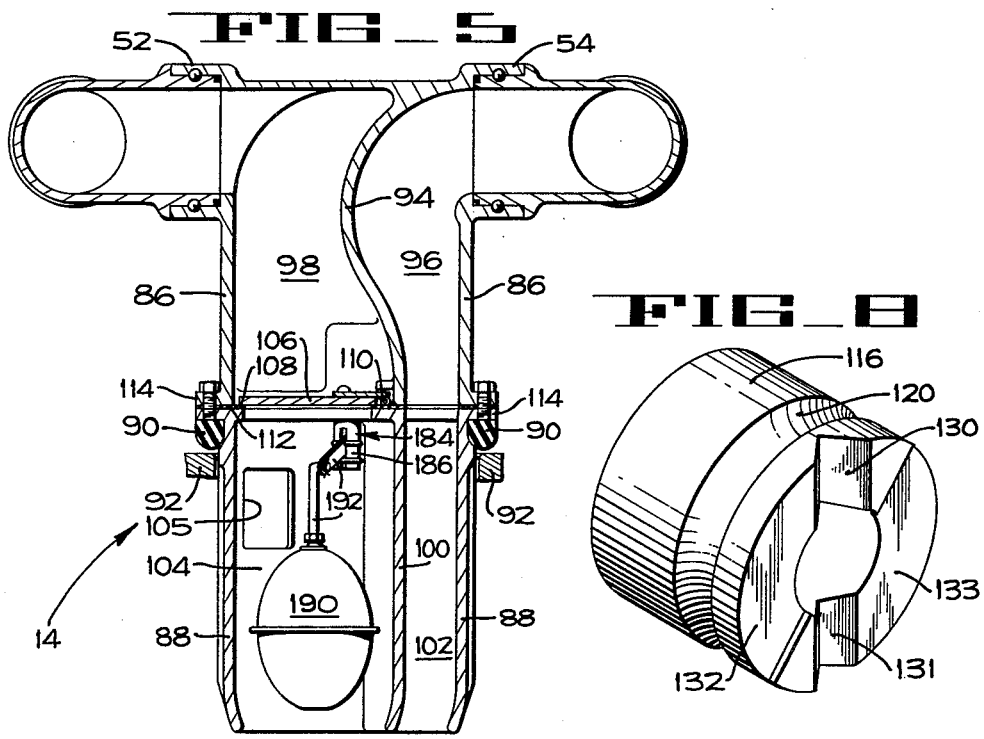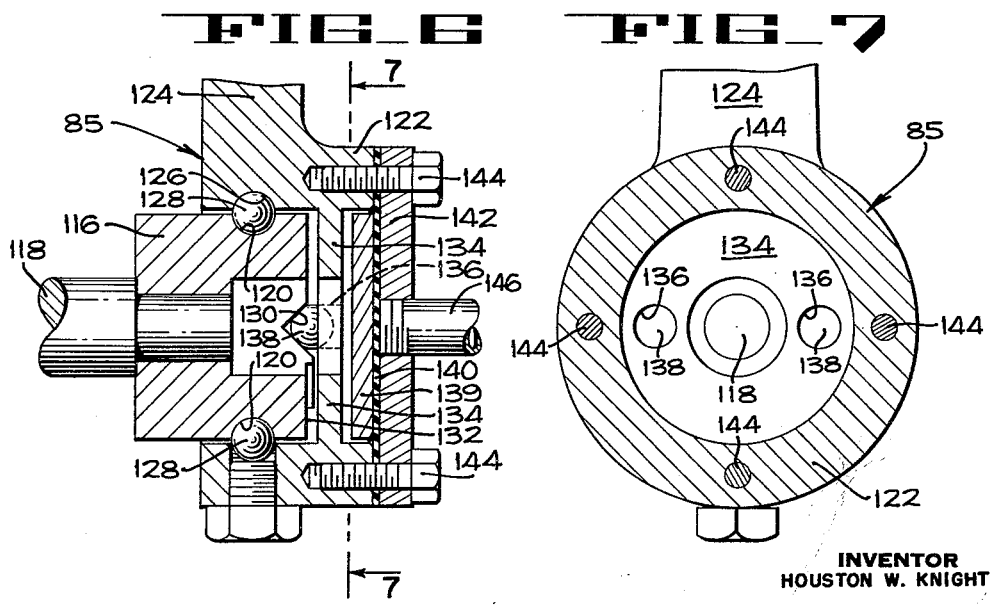

United States Patent Office 3,099,297
Patented July 30, 1963

3,099,297
FLUID HANDLING APPARATUS
Houston W. Knight, La Mirada, Calif., assignor, by mesne assignments, to FMC Corporation, San Jose, Calif., a corporation of Delaware
Filed Nov. 17, 1960, Ser. No. 69,844
8 Claims. (Cl. 141—207)

The present invention relates to fluid handling apparatus and more particularly to apparatus for loading gasoline or other volatile liquids into tank cars or other storage vessels.

The present invention is an improvement of the structure illustrated in the United States patent application of Houston W. Knight, Serial No. 38,163, filed June 23, 1960, for Apparatus for Handling Fluids.

An object of the present invention is to provide an improved apparatus for transferring liquids from one container to another.

Another object of the invention is to provide means responsive to fluid pressure for permitting flow of fluid through the handling apparatus only when the apparatus is properly and safely positioned with respect to the loading dome of a vessel.

Another object of the present invention is to provide an improved delivery head structure for fluid handling apparatus.

Another object of the invention is to provide a control system operated by fluid pressure for controlling the fluid handling apparatus.

These and other objects and advantages of the present invention will become more apparent from the following detailed description and the accompanying drawings, wherein:

FIG. 1 is a plan of the fluid handling apparatus of the present invention.

FIG. 2 is a side elevation of the structure of FIG. 1.

FIG. 3 is a schematic illustration of the control system for the structure of FIG. 1.

FIG. 4 is a section taken at 4—4 of FIG. 1.

FIG. 4A is an enlarged portion of the valve assembly of FIG. 4 parts being shown in a different operational position.

FIG. 5 is a section taken at 5—5 of FIG. 2.

FIG. 6 is a section taken at 6—6 of FIG. 2.

FIG. 7 is a section taken at 7—7 of FIG. 6.

FIG. 8 is a perspective of a coupling member shown in FIGS. 6 and 7.

The fluid handling apparatus disclosed in FIGS. 1 and 2 generally includes an inner boom section 10, an outer boom section 12, and a delivery head structure 14. The inner boom section 10 includes two conduits 16 and 18 which are mounted one above the other in the same vertical plane. The inner ends of the conduits 16 and 18 are mounted by means of swivel joints 20 and 22, respectively, for pivotal movement about a common vertical axis 24.

The lower swivel 22 is connected to a suitable riser pipe 28 from which fluid is delivered to the conduit 18. The upper swivel joint 20 is similarly connected to a suitable riser pipe 26 which conducts vapors from the conduit 16 to a suitable recovery system. Riser pipes 26 and 28 are respectively mounted by means of brackets 30 and 32 on a suitable rigid support 33.

The outer ends of conduits 16 and 18 are connected by two axially aligned swivel joints 34 and 36 to a fluid cross assembly 38. The cross assembly 38 is connected by two axially aligned swivel joints 40 and 42 to the inner ends of conduits 44 and 46 of the outer boom section 12. Cross member 38 is so constructed as to provide separate fluid communication between conduits 16 and 46 and between conduits 18 and 44.

The two swivel joints 34 and 36 permit movement of the outer boom assembly 12 relative to the inner boom assembly 10 about a vertical axis 48. The swivel joints 40 and 42 provide for movement of the outer boom assembly 12 about a horizontal axis 50. Two axially aligned swivel joints 52 and 54 connect the outer ends of the conduits 44 and 46 with the delivery head 14 and provide for movement of the delivery head relative to the conduits 44 and 46 about a horizontal axis 56.

Horizontal movement of the outer boom section 12 relative to the inner boom section 10 is manual. Vertical movement of the outer boom section 12 relative to the inner boom section 20 is accomplished by means of a pneumatic operating cylinder 58. Cylinder 58 is pivotally mounted on two brackets 60 and 62 which are fixed to the conduits 44 and 46, respectively. A piston rod 64 of the cylinder 58 is pivotally connected by a pivot pin 66 to a bracket fixed to the cross assembly 38.

A conduit or tube 70 is fixed to the conduit 18 of the inner boom section for delivering high pressure air through a flexible tube 74 and a tube 76 to a manually operated control valve 78. The control valve 78 is connected to opposite ends of the cylinder 58 through tubes 80 and 82 to provide air, when properly manipulated, to one or the other end of the cylinder, thereby effecting selective movement of the piston rod 64 with respect to the cylinder 58 to raise or lower the outer boom section 12 as desired.

A fluid delivery control valve 84 is incorporated in the conduit 46 to control the flow of fluid to the delivery head 14. A valve operating assembly 85 is connected to the operating shaft of valve 84. Assembly 85 will be later described in detail.

As shown in FIGS. 4, 4A and 5, delivery head 14 includes a tubular housing 86 which is connected to a lower tubular spout member 88 by a flanged joint 114. A downwardly facing sealing element 90 surrounds the spout member 88 adjacent the flanged connection 114 and is adapted to abut against the upper flange 92 of a cylindrical filling dome of the vessel to be filled.

An inner wall 94 (FIG. 5) separates the upper housing 86 into two passageways 96 and 98. A wall 100 similarly separates the lower tubular spout member 88 into two passageways 102 and 104. The passageway 96 is in communication with the passageway 102 and through the conduit 46 and conduit 18 with the riser pipe 28. Passageways 104 and 98 are in communication through conduits 44 and 16 with the vapor recovery riser 26. The wall of spout member 88 about the passageway 104 is provided with one or more "window" vents 105 which permit vapor to enter passageway 104 though liquid covers its lower end.

A flapper-type check valve 106 is connected by means of a hinge 110 within the lower end of passageway 98 and a seat 108 is formed for the valve by the upper portion of spout member 88 in conjunction with a gasket 112 of the flanged joint 114. As provided, vapors at very low pressure will displace the valve 106 and pass through it into the passage 98 without return.

The loading valve 84 may be any commonly known commercial valve, the only requirement being that the valve be automatically self closing in response to a spring, fluid flow, or other means. Therefore, when the valve is opened by means of the operating assembly 85, the same must be held open manually or by a latch at all times that the valve is to remain open.

The valve operator assembly 85 is shown in greater detail in FIGS. 6, 7 and 8. As shown, the assembly 85 includes a cylindrical coupling member 116 attached to the end of the operating stem or shaft 118 of the valve 84. Coupling member 116 is provided with an annular groove 120 defined in its outer circumferential surface. A hub 122, provided with an operating handle 124, surrounds the coupling member 116 and has defined therein an internal groove 126 corresponding to the groove 120. A plurality of balls 128 are mounted in the opposed grooves 120 and 126 to provide freely rotating connection between the hub and the coupling member.

Diametrically defined across the end of coupling member 116 are grooves 130 and 131 which may be generally V-shaped in configuration. Hub 122 has an internal flange 134 defined in proximity to said grooved end of coupling member 116. Two holes 136 are provided in the flange 134 and two balls 138 are disposed in the holes 136 where they may be received in the grooves 130 and 131. A back-up or pressure plate 139 is mounted within the hub 122 on the opposite side of the flange 134 from the coupling member 116 and may be pressed against the balls 138 to maintain the balls in the grooves. A resilient diaphragm 140 is stretched across the outer end of the hub 122 and is retained in place by a plate 142. Plate 142 is secured to hub 122 by fasteners such as cap screws 144. A conduit 146 is connected into the plate 142 to introduce high pressure air to the outer surface of the diaphragm 140. Responsive to such air pressure, diaphragm 140 presses the plate 139 against the flange 134 and moves the balls 138 into the grooves 130 and 131. At such time, the hub 122 is rotatively locked relative to the coupling member 116 and the shaft 118 may be rotated through force applied to the handle 124. When the air pressure is removed from the diaphragm 140, the plate 139 no longer engages the balls 138. The balls are thereby freed to move from the groove 130 and the handle 124 is in freewheeling relation to the coupling member 116.

As seen in FIGS. 6 and 8, the outer end of the coupling member 116 has undercut portions 132 and 133 arcuately extending from corresponding sides of the grooves 130 and 131. Such undercut portions prevent engagement of the hub 122 with the coupling member 116 when the handle 124 is moved in one direction with respect to the coupling member 116 but permit such engagement when the handle is moved in the opposite direction. As provided, this feature allows the valve 84 to be manually closed whether or not air is applied to the diaphragm 140 but prevents the valve from being opened unless the balls are forced into the grooves 130 by air pressure applied to the diaphragm 140.

If desired, a latch (not shown) may be provided to hold the handle 124 in open position so long as air is applied to the diaphragm 140. When the air is released from the diaphragm 140, the valve 84 will, of course, close though the handle be latched or held at the open position.

Air pressure is applied to the diaphragm 140 only under a particular set of conditions best illustrated by reference to the schematic control circuit of FIG. 3, taken in view of FIGS. 4 and 4A. Control valve 78 for the boom operating cylinder includes a sliding core 147 that is connected to handle 72 and is longitudinally movable within the body of the valve to any selected one of three positions. In FIG. 3, the core 147 is shown in position to block the flow from the supply tube 76 to the cylinder 58 and from the cylinder to the exhaust line 148. The core can be moved to permit air to flow through a passageway 150 into line 82 and one end of the cylinder 58 to force its piston and attached rod 64 in a first direction lowering the outer boom section 12, as best understood by reference to FIG. 2. Air is exhausted from the cylinder 58 through line 80, another passageway 152, and the vent line 148. When the core is moved in the opposite direction, crossed passageways 154 and 156 connect the air supply line 76 with the line 80 and the line 82 with the exhaust vent 148, moving the piston rod outwardly of the cylinder 58 and causing the boom section 12 to move upward.

A vertical bore 158 is defined in housing 86 (FIGS. 4 and 4A), which bore receives and serves as the housing for a movable core 160 of a valve 162. A hole 164 in spout member 88 receives a push rod 166 which provides mechanical linkage between the upper side of the sealing element 90 and the core 160. A ball check valve 168 is disposed in the upper end of bore 158 in a position to be lifted from its seat by upward movement of core 160. A line 83 is connected between the valve 162 and line 82 (FIG. 3).

The sealing element 90 is deformed when the delivery head 14 is forcefully brought into filling engagement with the flange 92 of a filling dome. Such deformation moves the push rod 166 and core 160 from a lower position (FIG. 4) to an upper position (FIG. 4A). When in upper position, core 160 opens the check valve 168, permitting air pressure to flow through valve 162 from line 83 to a passageway 170, blocks communication between a passageway 172 and a vent 174, and permits communication between a passageway 176 and a vent 178.

Sealing element 90 regains its original shape when released from engagement with the flange 92. The core 160 and linkage 166 thereon return to their lower positions. At such time, ball check valve 168 closes off communication from line 83, and at the same time the core 160 provides communication through passageway 176 to vent 178.

A vertical bore 180 in the housing 86 and a hole 182 in the spout member 88 accommodate a float control valve 184. Control valve 184 includes a valve body 186 containing a movable core 188, and a float 190 is operably connected to the core 188 through a mechanical linkage 192. Float 190 and its linkage 192 are arranged to move core 188 from a lower to an upper position responsive to a rise of liquid within the chamber 104. When in lower position (FIG. 4), core 188 provides communication between passageways 170 and 172. When in upper position (FIG. 4A), the core provides communication between passageways 172 and 176.

Passage 172 is connected through line 146 to the diaphragm 140 of the operating assembly 85.

By admitting air under pressure to the line 82, the delivery head may be placed in sealing relation with flange 92 with sufficient force to deform the seal 90 and push the valve core 160 to its upper position. Assuming that the receiving vessel to be loaded is sufficiently empty to permit the float 190 to remain in lower position, air will then be admitted from the line 82, through the line 83, past the check valve 168 and through the passageways 170 and 172 and the line 146 to displace the diaphragm 140.

Once air under pressure is admitted to the diaphragm 140, delivery valve 84 may be opened and held open by means of handle 124 so long as air pressure is exerted against the diaphragm 140. When the liquid in the receiving vessel rises sufficiently to move the float 190 from its lower to its upper position, passageway 170 is blocked off from passageway 172 (FIG. 4A) and passageway 172 is connected through passageway 176 to the vent 178. The pressure is thereby exhausted through vent 18 from the diaphragm 140, releasing the handle 124 from the valve operating shaft 118. Valve 84 then closes whether or not the operator releases the handle 124.

In the event that delivery head 14 may for some reason be moved from its sealing contact with the flange 92, the valve core 160 returns to a lower position, permitting check valve 168 to close and connecting passageways 146 and 172 with the vent 174. Under such condition the air pressure is removed from the diaphragm 140 and the valve 84 is permitted to close.

In operation, the delivery head 14 is manually positioned in the general vicinity of the tank dome flange 92 and started into its opening. The positioning valve 78 is actuated, allowing air pressure from line 76 to pass through port 150 and line 82 and venting the air through line 80 and passageway 152. The cylinder 58 is thereby caused to lower the delivery head into the flange 92. When the seal 90 makes solid contact with the flange, pressure builds up in the end of the cylinder 58 which holds the seal 90 firmly against the flange. When such downward force is applied, the sealing element 90 is deformed, moving the valve core 160 upward. Pressure is thereby allowed to enter the float valve 184 through passageway 170. Since at this time float 190 is in the lower position, air is permitted to flow through passageways 172 and 146 to the diaphragm of the valve operating assembly 85. Thus, with the pressure delivery head in positive contact with flange 92 and float valve in lower position, the valve operating assembly 85 is in readiness to permit the operator to manually actuate the filling valve 84 into open position. As previously mentioned, the valve provided can be closed by handle 124 regardless of the pressure behind diaphragm 140 but can be opened only when there is such pressure.

During the loading operation, vapors contained within the receiving vessel flow into the vapor collector system through the check valve 106. Check valve 106 will be reseated by gravity at any time the vapors stop flowing from the vessel. When the liquid level within the vessel rises sufficiently to move the float from its lower to its upper position, the line 146, passageways 172 and 176, and vent 178 are placed in communication, permitting the air pressure to be exhausted from diaphragm 140. The operating assembly 85 thereon freewheels with respect to shaft 118 of the valve 84 and the valve closes.

It is apparent that the fluid handling apparatus of the present invention will operate to deliver fluid to the receiving vessel only when the delivery head structure is placed in proper sealed relation with respect to the filling flange of the vessel and only when there is remaining space within the vessel to be filled. It is also seen that the vapors which otherwise would escape from the vessel to the atmosphere, and which are often dangerous mixtures of gasoline vapors and air, are automatically removed from the vessel as the vessel is being filled and pass to a vapor recovery system for processing.

While only one embodiment of the present invention has been shown and described, it will be understood that this apparatus for handling fluid described herein is capable of modification and variation without departing from the principles of the invention and that the scope of the invention should be limited only by the scope and proper interpretation of the claims appended thereto.

The invention having thus been described, that which is claimed to be new and is desired to be protected by Letters Patent is:

1. In a fluid handling apparatus, an articulated boom member, said boom member having a fluid delivery conduit, a delivery head connected to the movable end of said boom member, a power cylinder for moving said boom member, means actuating said power cylinder by fluid pressure, a self closing flow delivery valve connected in said fluid delivery conduit, a fluid pressure actuated valve operator member attached to said delivery valve, said delivery valve being operable by said operator member only at such time as fluid pressure is applied to said operator member, a first control valve mounted with said delivery head for providing fluid pressure to said operator member only at such time as said delivery head is in position to deliver fluid from said fluid delivery conduit to a receiving vessel, a float movably disposed within said delivery head, a second control valve mounted with said delivery head and said float for providing fluid pressure to said operator member only at such time as said float is below a certain liquid level within said receiving vessel.

2. In a fluid handling apparatus, an articulated boom having a fluid delivery conduit, a delivery head connected to said conduit, a power cylinder for moving said boom to maneuver said delivery head, a self closing fluid delivery valve connected in said fluid delivery conduit, a fluid pressure controlled valve operator member attached to said delivery valve, said delivery valve being operable by said operator member while fluid pressure is applied to said operator member, a first control valve mounted with said delivery head for providing fluid pressure to said operator member only when said delivery head is connected to a receiving vessel, a float movably disposed within said delivery head, a second control valve mounted with said delivery head and said float for providing fluid pressure to said operator member only when said float is below a certain liquid level within the receiving vessel.

3. Fluid handling appartus as defined in claim 2 wherein said operator member comprises a coupling adapted for connection to a rotating stem of said valve, a hub fitted in rotative relation around said coupling, connecting means mounted within said hub operably attaching said hub to said coupling only upon application of an external force to the connecting means, and a fluid pressure actuated operator mounted with said hub for applying said external force to said connecting means.

4. An operating member for a self-closing flow delivery valve comprising a coupling adapted for connection to a rotating stem of said valve, a hub fitted around said coupling in rotative relation thereto, a plurality of notches in the end face of said coupling, means mounted in ports within said hub and adapted to operably attach said hub to said coupling upon application of an external force, and a fluid pressure actuated plate mounted within said hub and responsive to an external force to project said means into the notches in said coupling to interconnect said coupling and said hub.

5. Apparatus for conveying fluid from a source toward a receiving vessel, comprising a movably mounted fluid conducting boom, a delivery head mounted on the boom, said boom being movable to place the delivery head in a particular position with relation to the receiving vessel, a self-closing delivery valve connected to the boom for controlling flow therethrough, a movably mounted handle for manually opening said valve, fluid pressure actuated means for releasably connecting said handle to the valve, means for supplying fluid pressure to said connecting means, and means responsive to both the liquid level within the receiving vessel and the position of said delivery head with respect to the receiving vessel for controlling said fluid pressure supplying means.

6. The apparatus of claim 5 wherein said pressure actuated handle connecting means comprises a coupling adapted for connection to a rotating stem of said valve, a hub fitted in rotative relation around said coupling, said handle being carried by the hub, connecting means mounted within said hub operably attaching said hub to said coupling only upon application of an external force to the connecting means, and a fluid pressure actuated operator mounted with said hub for applying said external force to said connecting means.

7. The apparatus of claim 5 wherein said delivery head comprises a cylindrical upper member defining a first passageway adapted for connection with a fluid delivery conduit and a second passageway adapted for connection with a fluid return conduit, said conduits being defined by said boom, a spout member defining a delivery spout in connection with said first passageway and a return spout in connection with said return passageway, said delivery spout being adapted to be seated in the filling dome of a receiving vessel, a check valve mounted with said head member permitting flow of fluid through said return spout only in the direction away from said receiving vessel, a first fluid pressure control valve mounted with said delivery head which is actuated by seating said spout member within a filling dome, a float mounted within said return spout, a second control valve mounted within said delivery head and connected for actuation by said float, said first control valve being adapted to pass fluid pressure to said pressure actuated handle connecting means when actuated and to vent fluid pressure from said handle connecting means when released, said second control valve being adapted to pass pressure to said handle connecting means when said float is at a lower position and to vent fluid pressure from said handle connecting means when said float is at an upper position.

8. A delivery head, comprising a cylindrical upper member defining a first passageway adapted for connection with a fluid delivery conduit and a second passageway adapted for connection with a fluid return conduit, a spout member defining a delivery spout in connection with said first passageway and a return spout in connection with said return passageway, said delivery spout being adapted to be seated in the filling dome of a receiving vessel, a check valve mounted with said delivery head permitting flow of fluid through said return spout only in a direction away from said receiving vessel, a first fluid pressure control valve mounted with said delivery head and actuated by seating said spout member within a filling dome, a float mounted within said return spout, a second control valve mounted with said delivery head and connected for actuation by said float, said first control valve being adapted to pass fluid pressure to a valve operator when actuated and to vent fluid pressure from said valve operator when released, said second control valve being adapted to pass pressure to said valve operator when said float is at a lower position and to vent fluid pressure from said valve operator when said float is at an upper position.

References Cited in the file of this patent
UNITED STATES PATENTS

| | | |
|---|---|---|
| 2,097,844 | Robinson | Nov. 2, 1937 |
| 2,153,372 | Hyde | Apr. 4, 1939 |
| 2,479,454 | Annin | Aug. 16, 1949 |
| 2,727,534 | Briede | Dec. 20, 1955 |
| 2,867,249 | Denlinger | Jan. 6, 1959 |